3,014,860
DENITRIFICATION OF HYDROCARBON OILS
Cornelis Th. Douwes and Pieter A. van Weeren, Amsterdam, Netherlands, assignors to Shell Oil Company, a corporation of Delaware
No Drawing. Filed Aug. 27, 1959, Ser. No. 836,333
Claims priority, application Netherlands Jan. 22, 1959
6 Claims. (Cl. 208—254)

This invention relates to the denitrification of hydrocarbon oils by a hydrogenation treatment with a special catalyst and to the catalyst per se.

It is known that most hydrocarbon oils contain small but apperciable percentages of compounds containing nitrogen. Generally the presence of such compounds even in very small amounts is detrimental since such compounds lead to or catalyze discoloration and/or deposit formation and/or odor bodies.

Also in many catalytic processes such as catalytic reforming and catalytic cracking the presence of nitrogen compounds even in concentrations corresponding to parts per million of nitrogen are generally quite detrimental. Consequently it is common to pretreat, e.g. with acids, hydrocarbon oils prior to subjecting them to such catalytic processes. In general, removal of nitrogen compounds occurs to some extent in catalytic hydrodesulfurization. However, such removal of nitrogen is far from complete and in the past catalysts have been chosen for their desulfurization ability with little or no attention to their nitrogen removing ability. To effectively remove nitrogen compounds a special catalyst designed for that purpose should be used.

According to the present invention hydrocarbon oils containing nitrogen compounds are treated with a special catalyst which has been found to be particularly effective in removing the nitrogen. In outline the process of the invention involves treating the hydrocarbon oil with hydrogen under known hydrofining conditions with a catalyst consisting of a silica-alumina composite xerogel carrier impregnated with cobalt or nickel and also impregnated with a small amount of additional alumina. The catalysts may also advantageously have incorporated in small amount of fluorine and/or boric oxide and/or molybdenum oxide. The catalyst is also preferably subjected prior to use to a high temperature calcination in a dry gas.

The process of the invention is applicable for the removal of nitrogen from any hydrocarbon oil containing nitrogen compounds. Particular feedstock contemplated are naphthas intended to be catalytically reformed with a platinum or palladium containing reforming catalyst, thermally cracked gasoline, crude coal tar naphtha, shale oil, catalytic cracking feedstock, transformer oils, and lubricating oils.

Suitable conditions are shown in the following Table I.

TABLE I

| | Preferred range | Broad range |
|---|---|---|
| Catalysts size | 1-5 millimeters | Powder to 20 millimeters. |
| Pressure | 30-80 atms | 10-100 atms. |
| Temperature | 325-420° C | 300-500° C. |
| Liquid hourly space velocity | 1-3 kg./l./hr | 0.5-12 kg./l./hr. |
| Hydrogen/oil ratio | 1,000-3,000 l. (NTP)/kg. | 200-6,000 l. (NTP)/kg. |
| Concentration of hydrogen in recycled gas, percent vol. | 60-95 | 50-100. |

The catalyst carrier which promotes the activity of the hydrogenation catalyst and also acts as the support giving body and structure to the catalyst is a xerogel consisting essentially of silica intimately combined with a minor amount up to about 50% of alumina. By a "xerogel" is meant a solid substantially non-hydrated body obtained by the drying of a hydrogel. The xerogel is characterized by a rigid highly microporous structure affording a large available surface of at least about 100 sq. meters per gram. By "intimately combined" is meant the sort of chemical or quasi chemical combination which leads to the impartation of acidity. Silica-alumina cracking catalyst is a good example. Such silica-alumina composites are generally prepared by impregnating a silica sol or hydrogel with a solution of an aluminum salt followed by hydrolysis of the aluminum salt with a base such as ammonium hydroxide. During the hydrolysis an interaction takes place between the silica and alumina. Other methods of combining the silica and alumina can however also be applied. For instance the activated clay type cracking catalyst produced by the Houdry Company is an excellent carrier.

The carrier contains at least 40% silica and is preferably predominantly silica with a lesser amount of alumina. The preferred concentrations are 65-95% silica and 5-35% alumina, e.g. silica-alumina cracking catalyst containing 75-90% silica are quite suitable.

The surface of the xerogel carries a nickel or cobalt promoter and also a second promoter of alumina deposited by impregnation, i.e. by wetting the xerogel with a solution containing a soluble compound of the metals after which the resulting products is dried and, if desired, calcined.

The impregnation is carried in one or more steps to incorporate between about 1 and 8 parts of cobalt or nickel for one hundred parts or carrier, e.g. equivalent to about 4-5% of the metal oxide in the finished catalyst. The quantity in which the aluminum salt is used is generally such that the final catalyst, i.e. the catalyst after drying and calcining, contains 1-20% by weight, preferably 5-12% by weight, of added alumina based on the carrier.

The cobalt and/or nickel may be supplied by any of the conventional soluble salts. The aluminum salts used are preferably those that are readily soluble and readily converted into alumina during the drying and calcining steps following the impregnation step. Examples of suitable salts are aluminum sulfate, aluminum nitrate, aluminum chloride, and aluminum ammonium double salts.

The carrier may be impregnated with the solution containing the aluminum salt either after or simultaneously with the impregnation with the salt of cobalt and/or nickel. If the alumina is incorporated by a separate impregnation after incorporating the cobalt and/or nickel the partially complete product may be dried between impregnations, for example at a temperature of 100° C.

The most active catalysts prepared according to the process of the invention are those which are simultaneously impregnated. This so-called co-impregnation may be effected by contacting the carrier simultaneously with separate solutions of the different salts but the co-impregnation is preferably carried out by impregnating the carrier with a solution which contains both the salt of nickel and/or cobalt and the aluminum salt.

The impregnation of the carrier with the solution or the solutions may be promoted by adding an aliphatic alcohol having from 4 to 6 hydroxyl groups to at least one of the solutions. Alcohols of this type are preferably used in quantities of 4–20% by weight based on the total solution with which the carrier is impregnated. Quantities of from 10 to 15% by weight are particularly recommended.

The catalyst may also advantageously be promoted with minor amounts of fluorine and/or boric oxide and/or molybdenum oxide. Thus, for example, the silica-alumina carrier may advantageously first be treated with a dilute solution (preferably under 10% concentration), of hydrogen fluoride or ammonium fluoride to incorporate 0.5 to about 3% fluorine and then dried. The carrier may then be impregnated with a solution of a mixture of cobalt and nickel nitrate containing about 10% pentaerythritol and saturated with boric acid. 'E.g. to incorporate 1–10 parts $B_2O_3$.) The solution may also contain ammonium molybdate sufficient to incorporate from about 5 to 15 parts of molybdenum oxide calculated as $MoO_3$ per 100 parts of the carrier. However, it will be understood that any of these substituents except the nickel or cobalt and aluminum may be omitted and that if the fluorine, boric oxide or molybdenum is included these may be incorporated in a different sequence or by different methods.

After impregnating the carrier with the nickel and/or cobalt and additional alumina the catalyst may be formed in pellets or other suitable shaped pieces if the carrier was not previously so formed, and then dried and calcined, e.g. at 500° C., to convert the cobalt and/or nickel and aluminum to the oxides.

The catalyst is preferably used in the form of small spheres or pellets measuring not more than about 5 millimeters in their longest dimension.

The catalyst may be reduced by treatment with hydrogen but this is not essential as the catalyst is normally reduced or partly reduced very quickly upon being used. The nickel and/or cobalt normally comes to equilibrium under the operating conditions. Thus the metals may be present in whole or in part as the free metal, the oxide or the metal sulfide. If molybdenum is also present the metal may be present as the metal molybdate but it is not considered probable that a true compound is formed.

The catalyst prepared as above described are more active in denitrification than the conventional cobalt-molybdena-alumina catalyst commonly used for hydrodesulfurization or cobalt-molybdene-silica-alumina catalyst without added alumina. Their denitrification activity is however further improved if the catalyst prior to use is subjected to a relative drastic calcination in a very dry atmosphere. The thermal treatment of the catalyst gives the best results when carried out at a temperature in the range from 600 to 675° C., preferably in the range of from 620 to 660° C. In any case the treatment temperature should not exceed 700° C., since otherwise there is a considerable decrease in the activity of the catalyst. The catalyst may be treated in the presence or absence of oxygen, nitrogen, or other gases or mixtures thereof and/or other gases such as air. The atmosphere, whatever its composition, should however be dry by which is meant containing less, and preferably appreciably less, than 1.6% by weight water vapor. Thus, if air is used it is preferably dried, e.g., by cooling to below 21.1° C. The heat treatment is maintained for at least 2 hours. Longer heating times do no harm.

The effect of the dry heat treatment is illustrated in the following Table II which shows the activity for denitrification of a gas oil under a given set of hydrodenitrification conditions with a batch of cobalt catalyst prepared with a silica-alumina cracking catalyst carrier and which after the impregnation was dried at 120° C. and then calcined in nitrogen at 350° C. Separate portions of this catalyst were heated in dry nitrogen for 3 hours at different temperatures and then tested during a 24-hour test period. The reported denitrification activities were then determined.

TABLE II

| Activating temperature of the catalyst, °C. | N in final product, p.p.m. | Nitrogen removal, percent |
|---|---|---|
| 400 | 46 | 61.6 |
| 450 | 47 | 60.8 |
| 500 | 42 | 65.0 |
| 550 | 39 | 67.5 |
| 600 | 40 | 67.5 |
| 650 | 42 | 65.0 |
| 700 | 67 | 44.2 |
| 750 | 87 | 27.5 |
| 800 | 108 | 14.4 |

It will be noted that the effective minimum temperature is about 500° C. and that temperatures much above 650° C. are to be avoided.

*Example I*

A silica-alumina cracking catalyst containing about 88% by weight silica and 12% by weight alumina and in the form of particles ranging in size from 1 to 4 millimeters was impregnated with an aqueous solution of cobalt nitrate, aluminum nitrate and ammonium molybdate in such a quantity that the final catalyst contained by weight 4.4 parts of cobalt oxide, 7.8 parts of added alumina and 11.2 parts of molybdnum oxide per 100 parts by weight of the carrier.

An approximate quantity of 10% by weight of sorbitol, based on the impregnating liquid, was added to the solution of the salt. The impregnated particles were dried at 120° C., then heated in a nitrogen atmosphere to 350° C., and finally heated to 600° C., for 3 hours in dry nitrogen, the nitrogen gradually being replaced by dry air.

In a similar manner a catalyst was prepared containing 11.7 parts by weight of added alumina instead of 7.8 parts by weight of added alumina.

The resulting catalysts were used in hydrodenitrification of a Middle East straight run gas oil having a boiling range of 250 to 380° C. and containing 120 parts per million of nitrogen. The reaction conditions were as follows: temperature 375° C., pressure 35 atmospheres absolute, space velocity 2 kg./l./hour, hydrogen/oil ratio 2000 l.(NTP)/kg.

The average nitrogen contents of the refined products obtained between the 35th and 85th test hour were determined. The following Table III summarizes the results. For comparison this table also includes the results obtained with a catalyst which was identical except that it contained no additional alumina, incorporated by impregnation.

TABLE III

| Catalyst | Nitrogen in final product, p.p.m. | Nitrogen removal, percent |
|---|---|---|
| Without additional alumina | 53 | 55.8 |
| With 7.8 parts by weight added alumina | 31 | 74.2 |
| With 11.7 parts by weight added alumina | 35 | 72.5 |

In this case the catalyst containing 7.8 parts by weight of added alumina per 100 parts by weight of carrier showed the most favorable activity.

*Example II*

In a similar manner as in Example I a catalyst was prepared in which the alumina incorporated by impregnation was 10 parts by weight per hundred parts of the carrier. The impregnation with the aluminum nitrate preceded that with the solution of cobalt nitrate and ammonium molybdate. The solution containing the later salts contained approximately 10% by weight of sorbitol. The final composition of the resulting catalyst was then 100 parts by weight of carrier
    10 parts by weight of alumina
    4.4 parts by weight of cobalt oxide
    11.2 parts by weight of molybdenum oxide.

The activity of the catalyst for the removal of nitrogen from the same gas oil as used in Example I was then determined in the same manner. The results are shown in the following Table IV.

TABLE IV

| Catalyst | Nitrogen in final product, p.p.m. | Nitrogen removal, percent |
|---|---|---|
| Without additional alumina | 53 | 55.8 |
| With 10 parts by weight of added alumina | 43 | 64.2 |

These results show that in this case also the activity was improved by the addition of the aluminum by impregnation but that this improvement was less than in Example I.

We claim as our invention:

1. Process for the removal of nitrogen from hydrocarbon oils containing the same which comprises contacting the oil in the presence of added hydrogen under hydrofining conditions of space velocity, temperature and pressure with a catalyst comprising xerogel carrier consisting of a major proportion of silica intimately combined with a minor proportion of alumina, said xerogel having incorporated on its surface by impregnation per 100 parts of said carrier about 1 to 8 parts by weight of a metal selected from the group consisting of cobalt, nickel and mixtures thereof, and about 1 to 20 parts by weight of additional alumina.

2. Process for the removal of nitrogen from hydrocarbon oils containing the same which comprises contacting the oil in the presence of added hydrogen under hydrofining conditions of space velocity, temperature and pressure with a catalyst comprising a xerogel carrier consisting of a major proportion of silica intimately combined with a minor proportion of alumina, said xerogel having incorporated on its surface by impregnation per 100 parts of said carrier about 1 to 20 parts by weight of additional alumina and about 1 to 8 parts by weight of a metal selected from the group consisting of cobalt and nickel and mixtures thereof, which catalyst prior to contacting with said oil has been calcined for at least two hours at a temperature of from about 600 to about 675° C. in an atmosphere containing less than 1.6% by weight of water vapor.

3. Process for the removal of nitrogen from hydrocarbon oils containing the same which comprises contacting the oil in the presence of added hydrogen under hydrofining conditions of space velocity, temperature and pressure with a catalyst comprising a xerogel carrier consisting of a major proportion of silica intimately combined with a minor proportion of alumina, said xerogel having incorporated on its surface per 100 parts of said carrier about 1 to 20 parts by weight of alumina and about 1 to 8 parts by weight of cobalt, which catalyst prior to contacting with said oil has been calcined for at least two hours at a temperature of from about 600 to about 675° C. in an atmosphere containing less than 1.6% by weight of water vapor.

4. Process for the removal of nitrogen from hydrocarbon oils containing the same which comprises contacting the oil in the presence of added hydrogen under hydrofining conditions of space velocity, temperature and pressure with a catalyst comprising a xerogel carrier consisting of a major proportion of silica intimately combined with a minor proportion of alumina, said xerogel having incorporated on its surface per 100 parts of said carrier about 1 to 20 parts by weight of alumina and about 1 to 8 parts by weight of nickel, which catalyst prior to contacting with said oil has been calcined for at least two hours at a temperature of from about 600 to about 675° C. in an atmosphere containing less than 1.6% by weight of water vapor.

5. Process according to claim 1 in which the catalyst also contains from about 5 to 15 parts of $MoO_3$.

6. Process according to claim 1 further characterized in that the catalyst is further promoted with a material selected from the group consising of fluorine, boric oxide and mixtures thereof in the amounts within the following ranges Fluorine _____ 0.5 to 3% based on the carrier
Boric oxide _____ 1 to 10% based on the carrier

References Cited in the file of this patent

UNITED STATES PATENTS

| | | |
|---|---|---|
| 2,790,751 | Gerald | Apr. 30, 1957 |
| 2,878,180 | Watkins | Mar. 17, 1959 |
| 2,905,625 | Berger | Sept. 22, 1959 |
| 2,905,636 | Watkins et al. | Sept. 22, 1959 |